(12) United States Patent
Shimamura

(10) Patent No.: US 6,788,633 B2
(45) Date of Patent: Sep. 7, 2004

(54) OPTICAL DISK REPRODUCING APPARATUS AND SETUP METHOD

(75) Inventor: Takao Shimamura, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 586 days.

(21) Appl. No.: 09/836,533

(22) Filed: Apr. 18, 2001

(65) Prior Publication Data

US 2002/0021633 A1 Feb. 21, 2002

(30) Foreign Application Priority Data

May 22, 2000 (JP) ........................................ 2000-150202

(51) Int. Cl.$^7$ ............................................... G11B 5/58
(52) U.S. Cl. .................... 369/53.22; 369/94; 369/44.26; 369/44.29
(58) Field of Search .............................. 369/53.1, 53.2, 369/53.22, 44.29, 94, 44.26

(56) References Cited

U.S. PATENT DOCUMENTS 6,535,468 B2 * 3/2003 Akiyama et al. ......... 369/47.52
6,614,736 B2 * 9/2003 Morizumi et al. ......... 369/53.1

* cited by examiner

Primary Examiner—Nabil Hindi
(74) Attorney, Agent, or Firm—Morgan, Lewis & Bockius LLP

(57) ABSTRACT

When a setup is performed by reproducing conditions corresponding to the first kind of optical disk and a setup is subsequently performed by reproducing conditions corresponding to the second kind of optical disk, the reproducing conditions which succeed to at least a part of the reproducing conditions corresponding to the first kind of optical disk are used as reproducing conditions corresponding to the second kind of optical disk and the setup is performed. When the setup is completed, the reproducing conditions corresponding to the optical disk as a target of the setup are stored. When the same optical disk is set up again, the stored reproducing conditions are used.

8 Claims, 10 Drawing Sheets

OPTICAL DISK REPRODUCING APPARATUS AND SETUP METHOD

BACKGROUND OF THE INVENTION

1. Field of the Invention

The invention relates to an optical disk reproducing apparatus and a setup method for promptly performing a setup for reproducing an optical disk under proper reproducing conditions.

2. Description of the Related Art

In recent years, as optical disks which can record a large amount of information, a CD (Compact Disk) and a DVD (Digital Video Disk or Digital Versatile Disk) have been known. The number of variations of each family of the CD and DVD increases. A CD-R and a DVD-R as write once optical disks and a CD-RW and a DVD-RW as rewritable optical disks are known.

In an optical disk reproducing apparatus which can reproduce only one kind of optical disk among those various kinds of optical disks, the usability cannot be improved. The development of an optical disk reproducing apparatus having what is called compatibility such that those various kinds of optical disks can be reproduced is, therefore, being progressed.

In the optical disk reproducing apparatus having the compatibility, the kind of optical disk loaded into the reproducing apparatus is discriminated, reproducing conditions suitable for reproducing the loaded optical disk are set up on the basis of a result of the discrimination, and thereafter, the actual information reproduction is performed.

That is, in the optical disks of different families such as CD and DVD, since there are differences in structure and optical characteristics such that materials of recording layers for recording information are different and the like, characteristics and the like of reading light which is emitted from a semiconductor laser have to be set up to proper reproducing conditions every optical disk of the different family and, thereafter, the actual information reproduction has to be performed.

Even in the optical disks of the same family, among the optical disks of the read only type, the write once type, and the rewritable type, characteristics and the like of the reading light which is emitted from the semiconductor laser have to be set up for the sake of proper reproducing conditions every optical disk since there are differences in structure and optical characteristics such that materials of recording layers for recording information are different and the like. Thereafter, the actual information reproduction has to be performed.

OBJECTS AND SUMMARY OF THE INVENTION

In the optical disk reproducing apparatus having the compatibility, it is necessary to prepare an individual setup program corresponding to each kind of optical disk in order to discriminate various kinds of optical disks and set up the proper reproducing conditions. A microprocessor (MPU) provided for the optical disk reproducing apparatus sequentially executes those plurality of setup programs in predetermined order, thereby discriminating the kind of loaded optical disk, so that the reproducing conditions suitable for the discriminated optical disk can be set up.

If the discrimination of the optical disk and the setup are executed by the above method, however, there is a case where after the execution of the setup program whose order has been determined to be the last, the kind of optical disk is determined for the first time. It takes a long time, consequently, until the completion of the setup. Awaiting time, therefore, that is necessary until the information reproduction is actually started becomes long and there is a problem such that the usability cannot be sufficiently improved or the like.

For example, if the order of executing the setup programs has been predetermined to the order such that the CD is set to the first order and the DVD is set to the next order, when the DVD is loaded, the execution of the setup program for the DVD is started after completion of the execution of the setup program for the CD. Further, the setup of the DVD is not completed until the completion of the execution of the setup program for the DVD, so that there is a problem such that a time that is required for setup becomes long.

In an optical disk reproducing apparatus having a changer mechanism equipped with a magazine which encloses a plurality of optical disks, when the user instructs a continuous reproduction or the like by designating a plurality of optical disks in the magazine, prior to exchanging the optical disk and starting the reproduction of the next optical disk, the setup of a long time similar to that mentioned above is executed each time. There is, consequently, a problem such that information such as music contents or the like recorded in each optical disk cannot be promptly reproduced.

The invention is made to solve the problems mentioned above and it is an object of the invention to provide an optical disk reproducing apparatus and a setup method which can reduce a time that is required for a setup.

To accomplish the above object, according to the invention, there are provided an optical disk reproducing apparatus and a setup method for performing a setup for reproducing a plurality of different kinds of optical disks by proper reproducing conditions, wherein after the setup is performed by the reproducing conditions corresponding to the first kind of optical disk, when the setup is subsequently performed by the reproducing conditions corresponding to the second kind of optical disk, the reproducing conditions which succeed to at least a part of the reproducing conditions corresponding to the first kind of optical disk are used.

When the setup is performed by the reproducing conditions corresponding to the first kind of optical disk, if the setup is not completed, the setup is sequentially executed by the reproducing conditions corresponding to the second kind of optical disk.

When the setup by the reproducing conditions corresponding to the first kind of optical disk or the setup by the reproducing conditions corresponding to the second kind of optical disk is completed, one or a plurality of conditions are stored as reproducing conditions only for the setup optical disk.

When the reproducing conditions corresponding to the optical disk to be set up have been stored, the setup is performed by using the stored reproducing conditions. When the reproducing conditions corresponding to the optical disk to be set up are not stored, the setup is performed by the reproducing conditions corresponding to the first kind of optical disk.

According to the invention, when the setup is performed by the reproducing conditions corresponding to the first kind of optical disk and the setup is subsequently executed by the reproducing conditions corresponding to the second kind of optical disk, the setup is performed by using the reproducing conditions which succeeds to at least a part of the reproducing conditions corresponding to the first kind of optical disk as reproducing conditions corresponding to the second kind of optical disk.

The time, therefore, that is required for the setup corresponding to the kind of optical disk is reduced.

After completion of the setup, the reproducing conditions corresponding to the optical disk used for the setup are stored, and when the same optical disk is set up again, the stored reproducing conditions are used. The time, therefore, that is required for the setup is reduced also by this method.

DETAILED DESCRIPTION OF THE PREFERRED EMBODIMENT

An embodiment of the invention will now be described hereinbelow with reference to the drawings.

An optical disk reproducing apparatus of the embodiment has a structure such that a magazine for enclosing a plurality of optical disks is detachably attached to an apparatus main body and also has a changer mechanism such that when the user designates one of the plurality of optical disks in the magazine, the designated optical disk is sequentially exchanged and reproduced.

The apparatus also has compatibility such that one of the CD family and the DVD family such as read only DVD, write once DVD, rewritable DVD, and the like can be reproduced.

Figure 1:
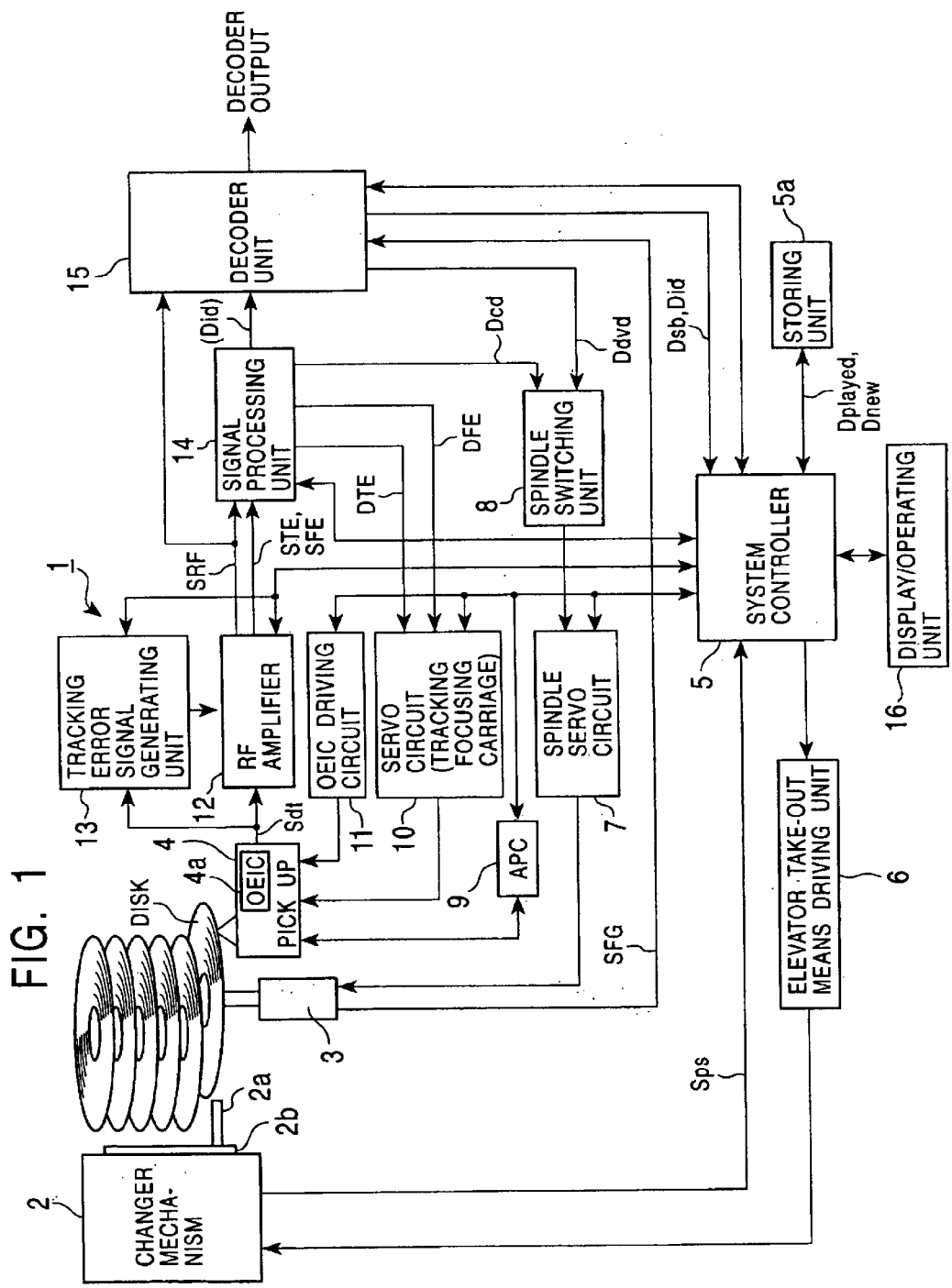
FIG. 1 is a block diagram showing a construction of a main section of an optical disk reproducing apparatus according to an embodiment.

FIG. 1 is a block diagram showing an optical disk reproducing apparatus 1 according to the invention. The optical disk reproducing apparatus 1 includes: a changer mechanism 2; a spindle motor 3 for rotating an optical disk DSK conveyed from the magazine (not shown) to a clamping position by the changer mechanism 2; and a pickup 4 for optically reading out recording information on the optical disk DSK.

The changer mechanism 2 has: disk unloading means 2a; and an elevator mechanism 2b for moving the disk unloading means 2a. The elevator mechanism 2b moves the disk unloading means 2a along the enclosing direction of the magazine. The disk unloading means 2a takes out the optical disk in the magazine, conveys it to the clamping position, and conveys the played optical disk DSK from the clamping position to the original enclosing position in the magazine.

In response to a command from a system controller 5 including a microprocessor (MPU), an elevator/unloading means driving unit 6 makes the disk unloading means 2a and elevator mechanism 2b cooperative, thereby performing the conveyance of the optical disk from the magazine to the clamping position and the conveyance of the optical disk from the clamping position to the magazine.

The system controller 5 successively monitors the moving position of the disk unloading means 2a on the basis of a detection output Sps from a position sensor (not shown) provided for the changer mechanism 2, thereby discriminating at which position in the magazine the optical disk DSK has been enclosed. The system controller 5 issues a command to the elevator/unloading means driving unit 6, thereby allowing the played optical disk DSK to be stored at the original storing position.

Further, the system controller 5 forms history data Dplayed in which data showing the kind of optical disk which was reproduced at least once, data showing the storing position of the optical disk, and data showing reproducing conditions which were set up upon reproduction of the optical disk have been made to correspond to each other. The system controller 5 stores the history data Dplayed into a storing unit 5a constructed by a non-volatile memory. When the same optical disk is reproduced again, the history data Dplayed regarding the optical disk is read out of the storing unit 5a and the setup is started on the basis of the history data Dplayed.

When an optical disk which is never reproduced yet, that is, a new optical disk is reproduced, the setup is started on the basis of standard reproducing condition data Dnew which has previously been stored in the storing unit 5a.

In the embodiment, reproducing condition data at the time of reproducing an optical disk of CD-DA has been stored as standard reproducing condition data Dnew.

A rotational speed of the spindle motor 3 is controlled by a digital servo by a spindle servo circuit 7. Further, a spindle switching unit 8 switches a control method of the spindle motor depending on whether the optical disk DSK is a CD or a DVD and instructs the switched control method to the spindle servo circuit 7.

That is, when the optical disk DSK is a CD, a signal processing unit 14 extracts a frame sync pattern signal included in an RF signal SRF, converts the frame sync pattern signal into frame sync pattern data Dcd of digital data, and supplies them to the spindle switching unit 8. A digital PLL (Phase Locked Loop) built in the spindle servo circuit 7 controls the rotational speed of the spindle motor 3 so as to eliminate a phase error between the frame sync pattern data Dcd and a frame sync clock of a standard frequency, so that a spindle servo pertinent to the CD reproduction is performed.

In the case where the optical disk DSK is a DVD, as an initial rotation control, the rotational speed of the spindle motor 3 is controlled on the basis of a rotation frequency signal SFG which is supplied from the spindle motor 3 and, thereafter, a spindle rotation control according to sync pattern data Ddvd of digital data is performed. At this time, the digital PLL (Phase Locked Loop) built in the spindle servo circuit 7 spindle-servo controls the rotational speed of the spindle motor 3 so as to eliminate a phase error between the sync pattern data Ddvd and the sync clock of the standard frequency, so that a spindle servo pertinent to the DVD reproduction is performed.

The spindle motor 3, consequently, is rotated at a linear velocity appropriate to either of the CD or DVD reproduction.

The pickup 4 includes a semiconductor laser element, an optical system, and a photodetector (both are not shown). A driving electric power to the semiconductor laser element is controlled by an APC (Automatic Power Control circuit) 9, so that a laser beam of a proper intensity is emitted in dependence on a kind of the optical disk to be played. An optical system converges the laser beam emitted from the semiconductor laser element and irradiates it as a reading light of a micro beam diameter onto the optical disk DSK. The optical system further converges reflection light from the optical disk DSK and allows it to enter the photodetector, thereby allowing a photodetection signal Sdt carrying thereon the recording information on the optical disk DSK and information such as tracking error, focusing error, and the like to be generated from the photodetector.

An integrating circuit for adjustment of an amplification factor called OEIC is provided at an output terminal of the photodetector. The photodetector photoelectrically converts the reflection light. An OEIC 4a adjusts an amplification factor in accordance with a control signal from an OEIC driving circuit 11, thereby adjusting an amplitude of a photoelectric conversion signal from the photodetector and generating the photodetection signal Sdt.

The pickup 4 includes an actuator (not shown) for finely adjusting the positional relation of an objective lens included in the optical system to the optical disk DSK. A servo circuit 10 drives the actuator and controls a position of the objective lens against the optical disk DSK, thereby performing a tracking servo and a focusing servo.

The servo circuit 10 is comprised of a digital servo circuit and executes the tracking servo and focusing servo on the basis of tracking error data DTE and focusing error data DFE which are supplied from the signal processing unit 14.

A carriage mechanism (not shown) which is moved forward and backward in the radial direction of the optical disk DSK is also provided. The pickup 4 is attached to the carriage mechanism. The servo circuit 10 performs a carriage-servo control to the carriage mechanism on the basis of a low frequency component of the tracking error data DTE, thereby moving the pickup 4 in the radial direction of the optical disk DSK.

There is provided an RF amplifier 12 for generating the RF signal SRF and a focusing error signal SFE from the photodetection signal Sdt which is generated from the photodetector included in the pickup 4. A tracking error signal generating unit 13 for generating a tracking error signal STE from the photodetection signal Sdt is provided. The generated RF signal SRF, focusing error signal SFE, and tracking error signal STE are supplied to the signal processing unit 14 constructed by a digital signal processor (DSP). Further, the RF signal SRF is supplied to a decoder unit 15.

As mentioned above, the signal processing unit 14 generates the frame sync pattern data Dcd from the RF signal SRF, supplies it to the spindle switching unit 8, converts the tracking error signal STE and focusing error signal SFE into the tracking error data DTE and focusing error data DFE, and supplies them to the servo circuit 10. Further, upon reproduction of the CD, subcoding data Dsb is extracted by the decoder unit 15 and supplied to the system controller 5. Upon reproduction of the DVD, identification code data (ID code data) Did is extracted from the RF signal SRF and supplied to the decoder unit 15. Further, the decoder unit 15 supplies the ID code data Did to the system controller 5.

As mentioned above, the decoder unit 15 converts the rotation frequency signal SFG from the spindle motor 3 into the sync pattern data Ddvd and supplies it to the spindle servo circuit 7. The decoder unit 15 also decodes the RF signal SRF, thereby converting it into reproduction data such as an audio stream and the like recorded on the optical disk DSK and generating it.

The system controller 5 not only controls the operation of the whole optical disk reproducing apparatus 1 but also performs a gain control and an offset control of an amplifier built in each of the RF amplifier 12, tracking error signal generating unit 13, and OEIC driving circuit 11. The system controller 5 also performs a gain control and a balance control of a digital equalizer and an amplifier built in each of the servo circuit 10 and spindle servo circuit 7. Moreover, an output of the semiconductor laser element is adjusted by controlling a gain of an amplifier built in the APC 9. In addition, at the time of setup, which will be explained hereinlater, a control for setting up reproducing conditions suitable for the optical disk DSK is performed.

A display/operating unit 16 is provided so that the user instructs designation of a desired optical disk, designation of a title, start of the reproduction, and the like to the system controller 5. The unit 16 displays an operating mode and an operation menu of the optical disk reproducing apparatus 1 on the basis of display data from the system controller 5.

Within the operations of the optical disk reproducing apparatus according to the invention having the above construction, the operation at the time of setup will now be described with reference to flowcharts of FIGS. 2 to 10.

Figure 2:
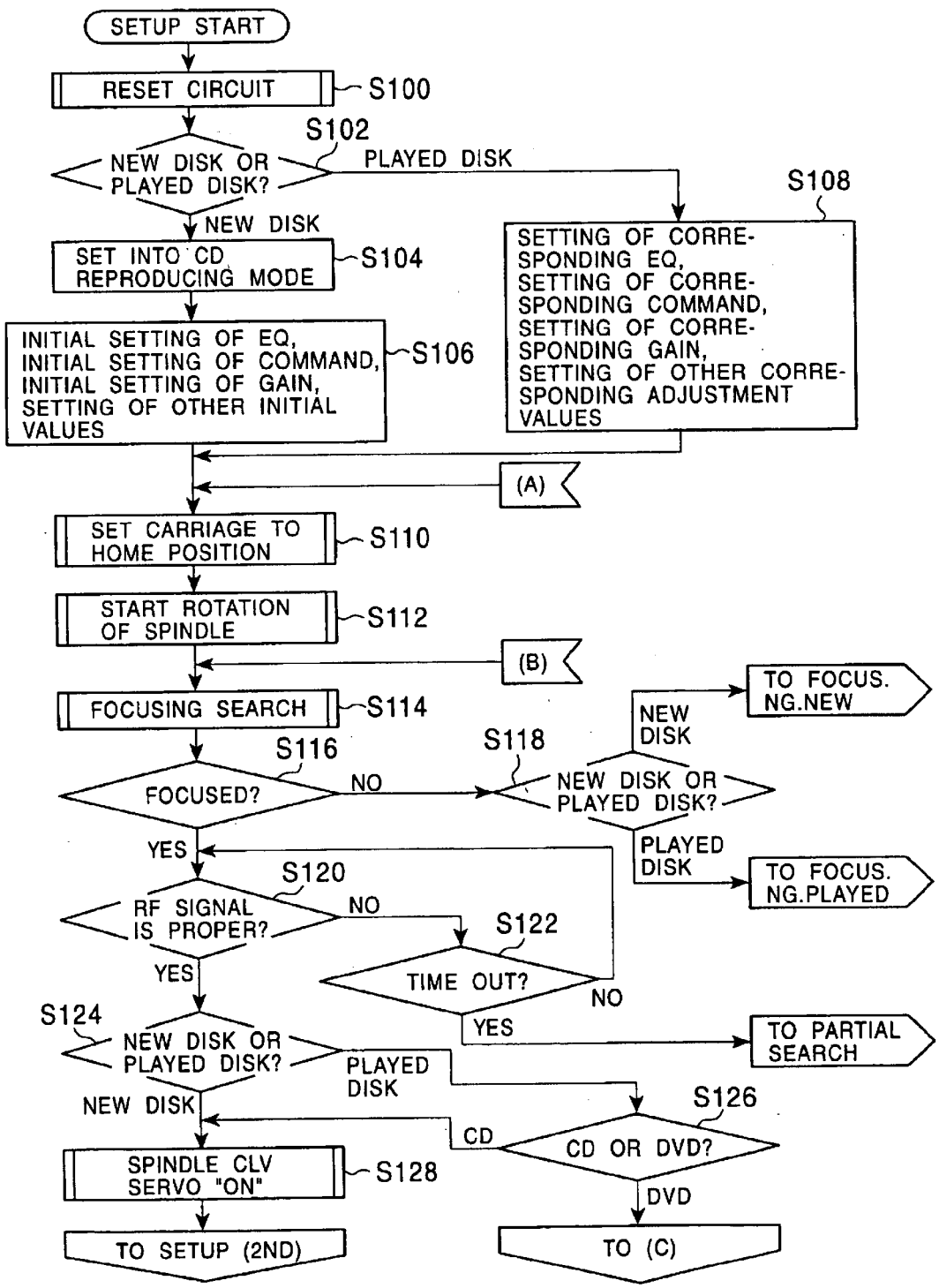
FIG. 2 is a flowchart for explaining the setup operation.

When the user designates a desired optical disk through the display/operating unit 16, the changer mechanism 2 conveys the designated optical disk DSK to the clamping position. A setup process shown in FIG. 2 is started.

First, in step S100, the circuits constituting the optical disk reproducing apparatus 1 are reset. After that, in step S102, the system controller 5 discriminates whether the optical disk DSK conveyed to the clamping position is a new disk which has never been reproduced (hereinafter, referred to as a NEW DISK) or a disk which has been reproduced at least once (hereinafter, referred to as a PLAYED DISK).

That is, the storage or retreat position of the optical disk DSK is compared with the history data Dplayed in the storing unit 5a. If the history data Dplayed regarding the optical disk DSK does not exist, it is determined that it is the NEW DISK and step S104 follows. If the history data Dplayed exists, it is determined that it is the PLAYED DISK and step S108 follows.

In step S104, the optical disk reproducing apparatus 1 is set into a mode for reproducing a CD-DA. Further, in step S106, reproducing conditions of the CD-DA are initially set on the basis of the standard reproducing condition data Dnew stored in the storing unit 5a. For example, a process for initially setting characteristics of the digital equalizer and the gain of the amplifier in each of the servo circuits 7 and 10, a process for setting a command for reproducing the CD-DA into the system controller 5, and the like are executed.

When the processing routine advances to step S108, reproducing conditions are set on the basis of the history data Dplayed corresponding to the optical disk DSK. For example, the reproducing conditions are set on the basis of the final equalizer characteristics, a final command, and final gain characteristics at the time when the optical disk DSK is previously (finally) reproduced.

When the reproducing conditions corresponding to the NEW DISK and PLAYED DISK are set as mentioned above, the carriage mechanism is subsequently moved to the home position (position on the innermost rim side of the optical disk DSK) (step S110) and the spindle motor 3 is rotated (step S112).

Subsequently, in step S114, a focusing search is performed to close the focusing servo. That is, an operation control is performed so as to set an objective lens in the pickup 4 into a focusing state (in-focus state) to an area near the home position of the optical disk DSK. The focusing search is executed only for a predetermined time period. Even if the focusing state is obtained or even if the focusing state is not obtained, the processing routine advances to step S116 upon the elapse of the predetermined time period.

Subsequently, in step S116, whether the focusing state has been obtained by the focusing search process in step S114 or not is discriminated, that is, whether the focusing servo could be closed or not is discriminated. If the focusing state is not obtained (NO), step S118 follows and whether the optical disk DSK is the NEW DISK or PLAYED DISK is discriminated again. If it is the NEW DISK, the processing routine advances to a process for "FOCUS.NG.NEW" shown in FIG. 5. If it is the PLAYED DISK, the processing routine advances to a process for "FOCUS.NG.PLAYED" shown in FIG. 6.

If it is determined in step S116 that the focusing state is obtained (YES), step S120 follows. Further, whether the proper RF signal SRF could be obtained within a predetermined time-out period set in step S122 or not is discriminated.

Figure 9:
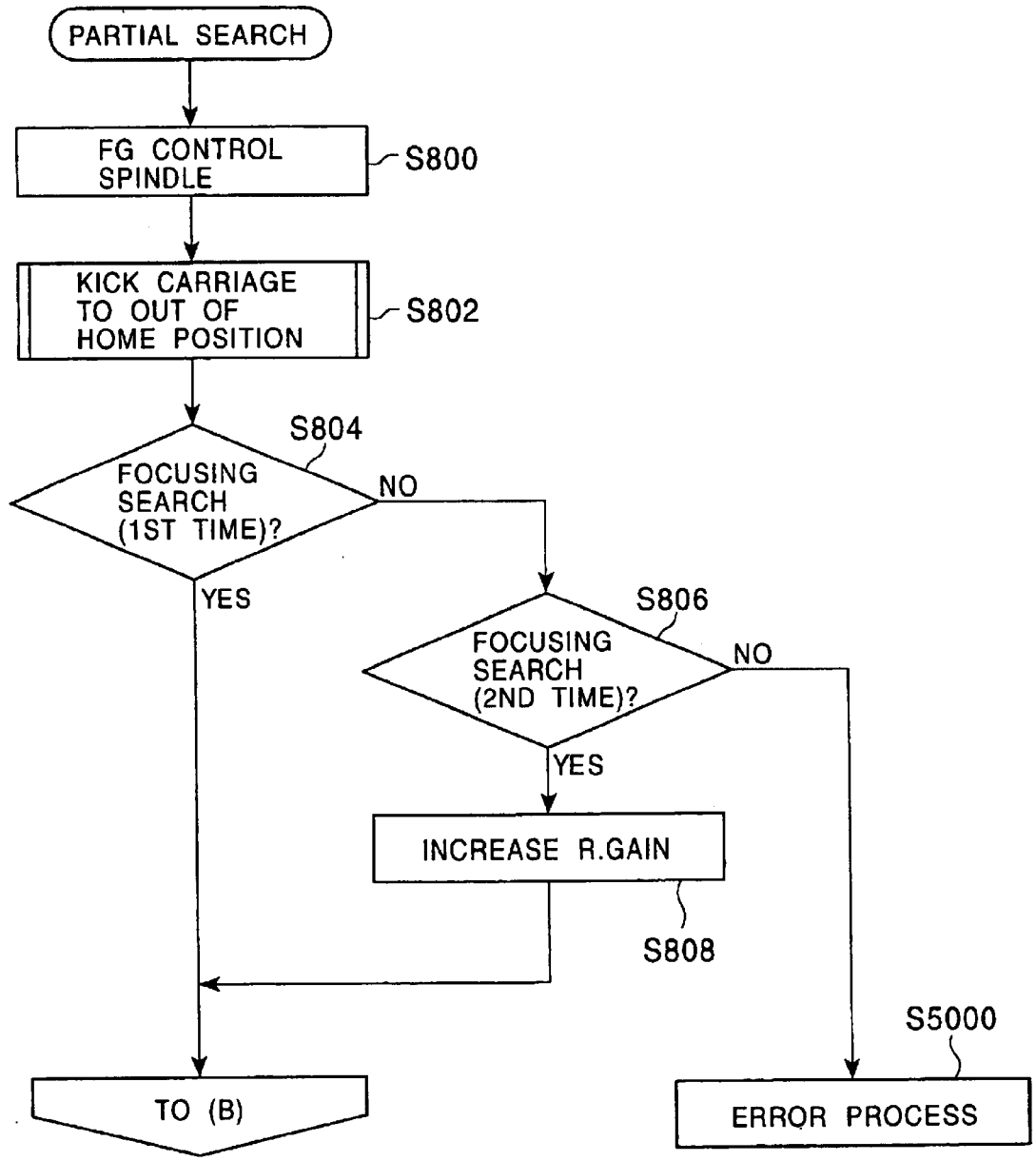
FIG. 9 is a flowchart for explaining a process for "partial search"

If the proper RF signal SRF is not obtained within the time-out period, that is, if the time-out occurs in step S122 (YES), the processing routine advances to a process for "partial search" shown in FIG. 9.

If the proper RF signal SRF is obtained within the time-out period, that is, if YES in step S120, the processing routine advances to step S124. Whether the optical disk DSK is the NEW DISK or PLAYED DISK is discriminated again. In case of the PLAYED DISK, step S126 follows and whether the optical disk DSK is the CD or DVD is discriminated again. If the optical disk DSK is the PLAYED DVD in step S126, the processing routine advances to a process in step S204 in "setup (2nd)" shown in FIG. 3.

If it is determined in step S124 that the disk DSK is the NEW DISK (YES) or if it is determined in step S126 that the disk DSK is the PLAYED CD (CD), step S128 follows. The spindle servo is started on the basis of the standard reproducing condition data Dnew so as to set the rotational speed of the spindle motor 3 to the same linear velocity (CLV) as that in the reproducing conditions of the CD-DA. The processing routine advances to the process in "setup (2nd)" shown in FIG. 3.

As mentioned above, in the processes shown in the flowchart of FIG. 2, reproducing conditions are first set in accordance with whether the optical disk DSK is the NEW DISK or the PLAYED DISK (steps S102 to S108) and the focusing search is subsequently performed (steps S110 to S114).

If it is determined in steps S116 and S118 that the focusing state is not established and the disk is the NEW DISK, there is a possibility that the optical disk DSK is not the CD-DA. The processing routine, therefore, advances to a process for "FOCUS.NG.NEW" shown in FIG. 5 and a process is executed for discriminating a property of the optical disk DSK such as a kind thereof.

If it is determined in steps S116 and S118 that the focusing state is not established and the disk is the PLAYED DISK, the processing routine advances to a process for. "FOCUS-.NG.PLAYED" shown in FIG. 6 and a further fine process is executed.

Further, if the proper RF signal cannot be obtained although the focusing state was established in steps S120 and S122, since there is a possibility that the disk is what is called a partial disk having a region where no information is recorded, the processing routine advances to a process for "partial search" shown in FIG. 9.

Moreover, in steps S124 and S126, whether the optical disk DSK corresponds to which one of the four combinations of "NEW DISK", "PLAYED DISK", "CD", and "DVD" is discriminated. If there is a possibility of "PLAYED DISK and DVD", the processing routine advances to processes from step S204 in the halfway of "setup (2nd)" shown in FIG. 3. If there is another possibility, the processing routine advances to the first process in "setup (2nd)" shown in FIG. 3.

The followings are possible cases other them those mentioned above:

Case.1 where the disc is a NEW DISK and CD,
Case.2 where the disc is a NEW DISK and DVD, and
Case.3 where the disc is a PLAYED DISK and CD.

As mentioned above, in the processes shown in the flowchart of FIG. 2, a process for roughly classifying the kind of optical disk DSK is executed on the basis of whether the focusing state could be established by the focusing search or not, a detection result of the RF signal SRF, and the like.

The processes for "setup (2nd)" shown in FIG. 3 will now be described.

The processes for "setup (2nd)" is started in the case where the focusing state is obtained and the proper RF signal is obtained in the processes in FIG. 2.

If the processing routine advances to "setup (2nd)" subsequently to step S128 in FIG. 2, whether the digital PLL in the spindle servo circuit 7 has been PLL locked three or more times within a predetermined time-out period or not is discriminated in steps S200 and S202. That is, in step S128 in FIG. 2, the CD-DA is regarded as a target, the rotation of the spindle motor 3 is started and whether the optical disk DSK is rotating at a predetermined linear velocity by the spindle servo based on the frame sync pattern signal or not is discriminated.

If the digital PLL is PLL locked three or more times within the predetermined time-out period, step S204 follows. If it is not PLL locked three or more times, the processing routine advances to processes for "DVD focusing search" shown in FIG. 10.

That is, if the digital PLL is PLL locked three or more times, there is a possibility of corresponding to the case of above-mentioned Case.1 or Case.3. In any case, since the PLL lock is performed under the reproducing conditions of the CD reproduction without a problem, step S204 follows while continuing the reproducing conditions of the CD reproduction. If the PLL lock is not performed three or more times, since there is a possibility of corresponding to the above Case.2, that is, the case of the NEW DISK and DVD, the processing routine advances to processes for "DVD focusing search" and a discriminating process about the DVD and the like are executed.

In case step S204 is the sequel to step S126 in FIG. 2, there is a possibility of "PLAYED DISK and DVD" as mentioned above. That is, in step S102 in FIG. 2, it is determined that the optical disk DSK is "PLAYED DISK and DVD". Further, in step S108, this case corresponds to the case where the reproducing conditions of the spindle servo have been set on the basis of the history data Dplayed of the optical disk DSK. Since the optical disk DSK as a DVD is rotated at the linear velocity of the DVD reproducing conditions, the processes in steps S200 and S202 are omitted and the processing routine directly advances from step S126 to step S204 while continuing the DVD reproducing conditions.

Subsequently, in step S204, it is determined whether or not a slight defocusing state is caused due to a temporary mechanical vibration or the like although the focusing state has already been obtained. In other words, it is determined whether or not such a slight defocusing state it as the focusing state can be readily derived has been caused even if the focusing has been established. If the slight defocusing state occurs (YES), a tracking balance adjustment in step S206 and a closing process for the tracking servo in step S208 are executed. After that, step S210 follows. If the slight defocusing state does not occur (NO), the tracking balance adjustment in step S206 is omitted and the closing process of the tracking in step S208 is executed. After that, step S210 follows.

Whether the optical disk DSK is the CD or DVD is again discriminated in step S210. In case of the DVD, step S212 follows. The spindle servo circuit 7 is set into a state to close the spindle servo of the DVD. After that, the processing routine advances to processes for "setup (3rd)" shown in FIG. 4.

Figure 4:
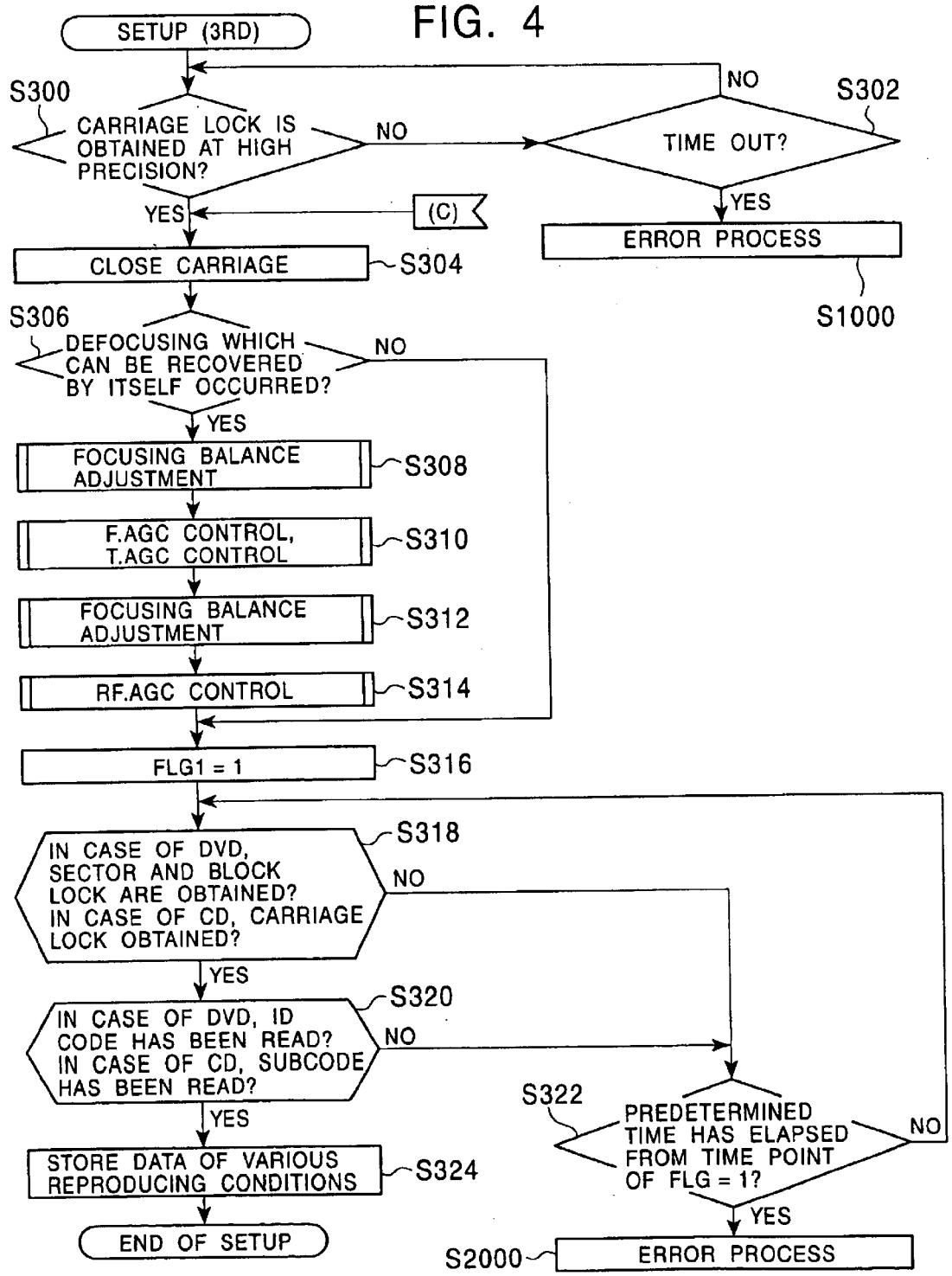
FIG. 4 is a flowchart for explaining a process for a setup (3rd)

If it is determined that the disk is the CD in step S210, step S304 in FIG. 4 follows.

Figure 3:
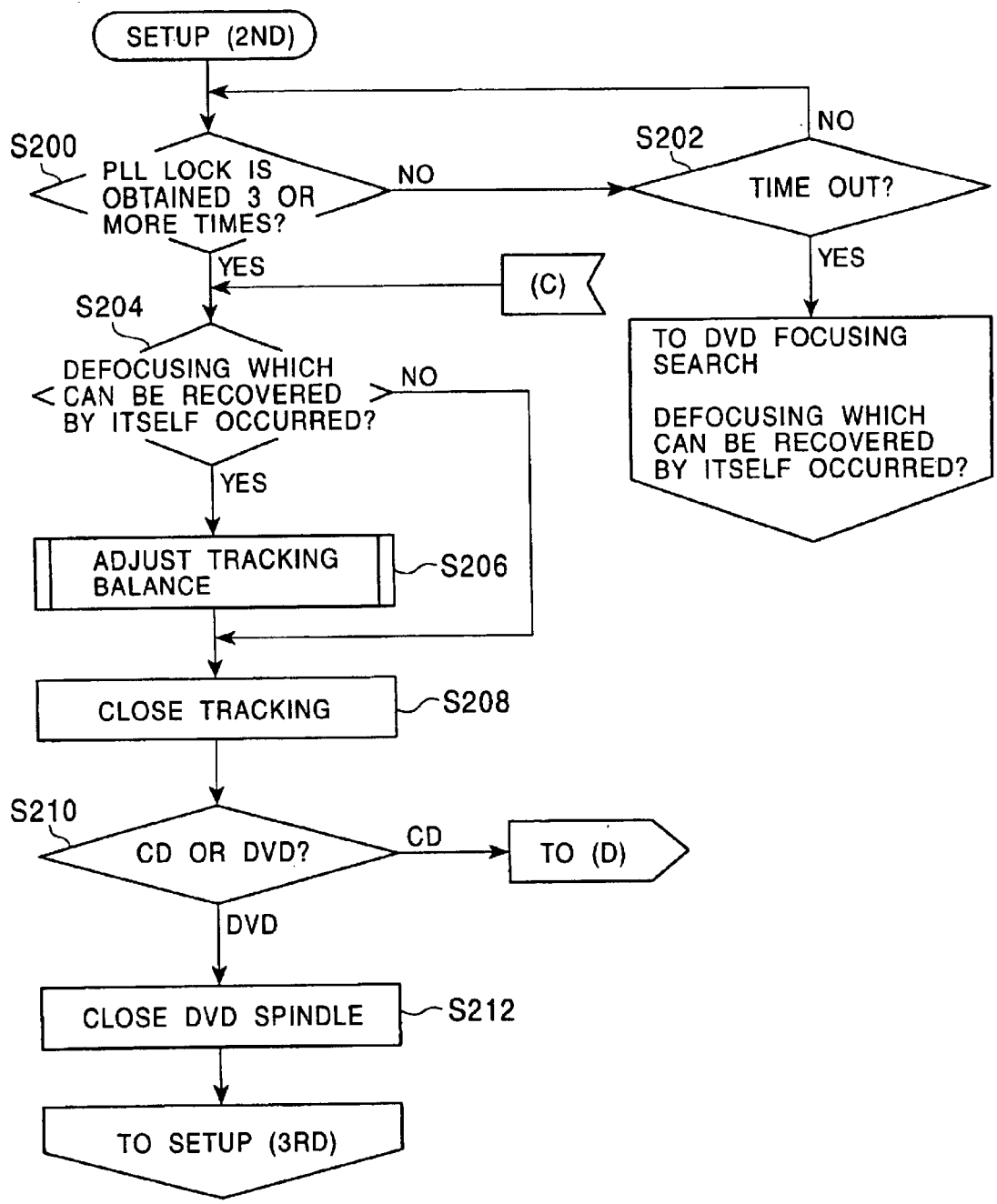
FIG. 3 is a flowchart for explaining a process for a setup (2nd)
Figure 10:
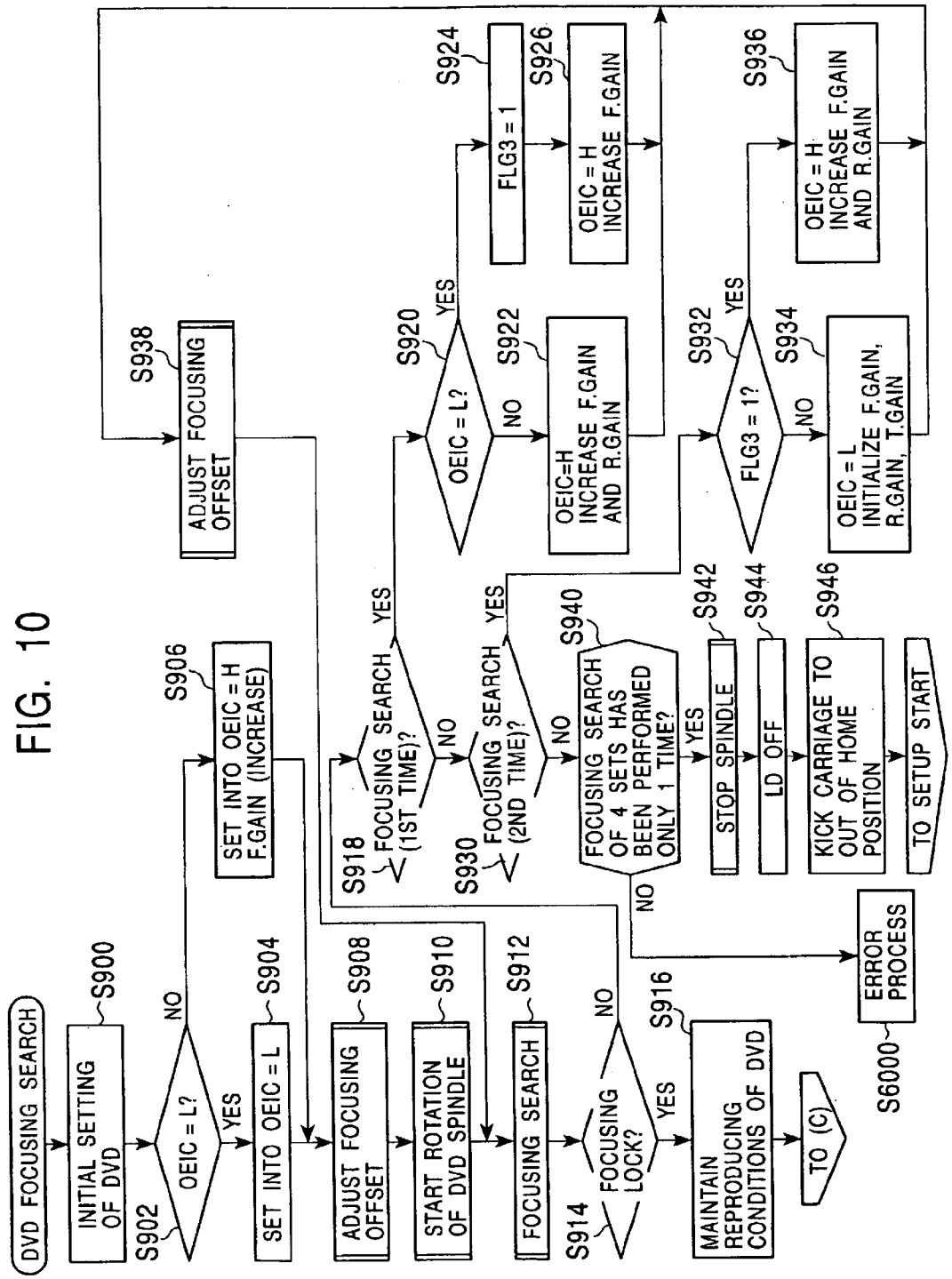
FIG. 10 is a flowchart for explaining a process for "DVD focusing search".

If, in the processes for "setup (2nd)" shown in FIG. 3 mentioned above, by discriminating the state of the spindle servo in steps S200 and S202, it is determined that there is a possibility that the optical disk DSK is "NEW DISK and DVD", the processing routine advances to processes for "DVD focusing search" in FIG. 10. If it is determined that there is a possibility that the optical disk DSK is "NEW DISK and CD" or "PLAYED DISK and CD" and if it is decided that the disk is "PLAYED DISK and DVD", the processing routine advances to the processes in steps S204 to S210. If, further, by discriminating whether the disk is the CD or DVD in step S210, there is a possibility that the optical disk DSK is "NEW DISK and CD" or "PLAYED DISK and CD", the step S304 in FIG. 4 follows. If there is a possibility of "PLAYED DISK and DVD", the processes for "setup (3rd)" shown in FIG. 4 are executed from the first process through step S212.

The processes for "setup (3rd)" shown in FIG. 4 will now be described.

When there is a possibility of "PLAYED DISK and DVD", it is determined whether the spindle servo of the DVD has been locked within a predetermined time-out period or not by processes in steps S300 and S302. If the spindle servo is not locked, it is determined that it is a defective disk having a fouling, a scratch, or the like although there is a high possibility that the optical disk DSK is "PLAYED DISK and DVD". An error is displayed by the display/operating unit 16 by an error process (step S1000). A process is executed for forcedly returning the optical disk DSK from the clamping position into the original storage position in the magazine or the like.

If the spindle servo is locked, step S304 follows and the closing process for the carriage servo is executed. Even if there is a possibility of "NEW DISK and CD" or "PLAYED DISK and CD" as mentioned above, the closing process for the carriage servo in step S304 is executed.

Subsequently, in step S306, a discrimination similar to that in step S204 is executed. If there are executed the slight defocusing state occurs (YES), the focusing balance adjustment (step S308), a control of gains (F.AGC and T.AGC) of AGC circuits for automatically controlling servo gains of the focusing servo and tracking servo in the servo circuit 10 (step S310), a readjustment of the focusing balance (step S312), and a control of a gain (RF.AGC) of an AGC circuit of the RF amplifier 12 (step S314). Step S316 follows. If, in step S306, the slight defocusing state does not occur (NO), the processing routine directly advances to step S316.

After the processes to step S316 are executed, the kind of optical disk DSK is almost certainly determined and, further, the optical disk reproducing apparatus 1 enters a state where the reproducing conditions suitable for the optical disk DSK have been set. In step S316, therefore, the system controller 5 sets flag data into FLG1=1 and, thereafter, a predetermined timer is reset and started, thereby preparing for execution of final processes in steps S318 to S324.

If, in step S318, the optical disk DSK is the DVD, whether a sector and a block lock have been obtained or not is discriminated. If the optical disk DSK is the CD, whether the spindle servo has been closed (that is, locked) or not is discriminated.

If, further, in step S320, the optical disk DSK is the DVD, whether the ID code data Did has been obtained or not is discriminated. If the optical disk DSK is the CD, whether the subcoding data Dsb has been obtained or not is discriminated.

In step S322, a predetermined time-out time from a point when the flag data is set to FLG1=1 is measured. If all of the discrimination results in steps S318 and S320 indicate (YES) within the predetermined time-out period, the data of the reproducing conditions which have been set so far in order to reproduce the optical disk DSK is stored as history data Dplayed into the storing unit 5a in step S324. After that, the setup is completed and the ordinary reproducing operation is started.

In step S324, the following data is stored as data for the reproducing conditions: that is, a focusing offset value F.OFFSET; a focusing balance coefficient F.BC; an AGC coefficient F.AGC for automatically controlling the focusing gain; an AGC coefficient T.AGC for automatically controlling the tracking gain; a tracking balance coefficient T.BC; an RF level set value for setting a level of the RF signal; an amplification factor F.GAIN for setting the focusing gain; a form position of the carriage mechanism; and the like.

If at least one of the discrimination results in steps S318 and S320 are set to (NO) within the predetermined time-out time, that is, if the timer times out in step S322 (YES), an error process (step S2000) is executed, an error is displayed, and a process is executed for forcedly returning the optical disk DSK to the original storage position in the magazine or the like.

Figure 5:
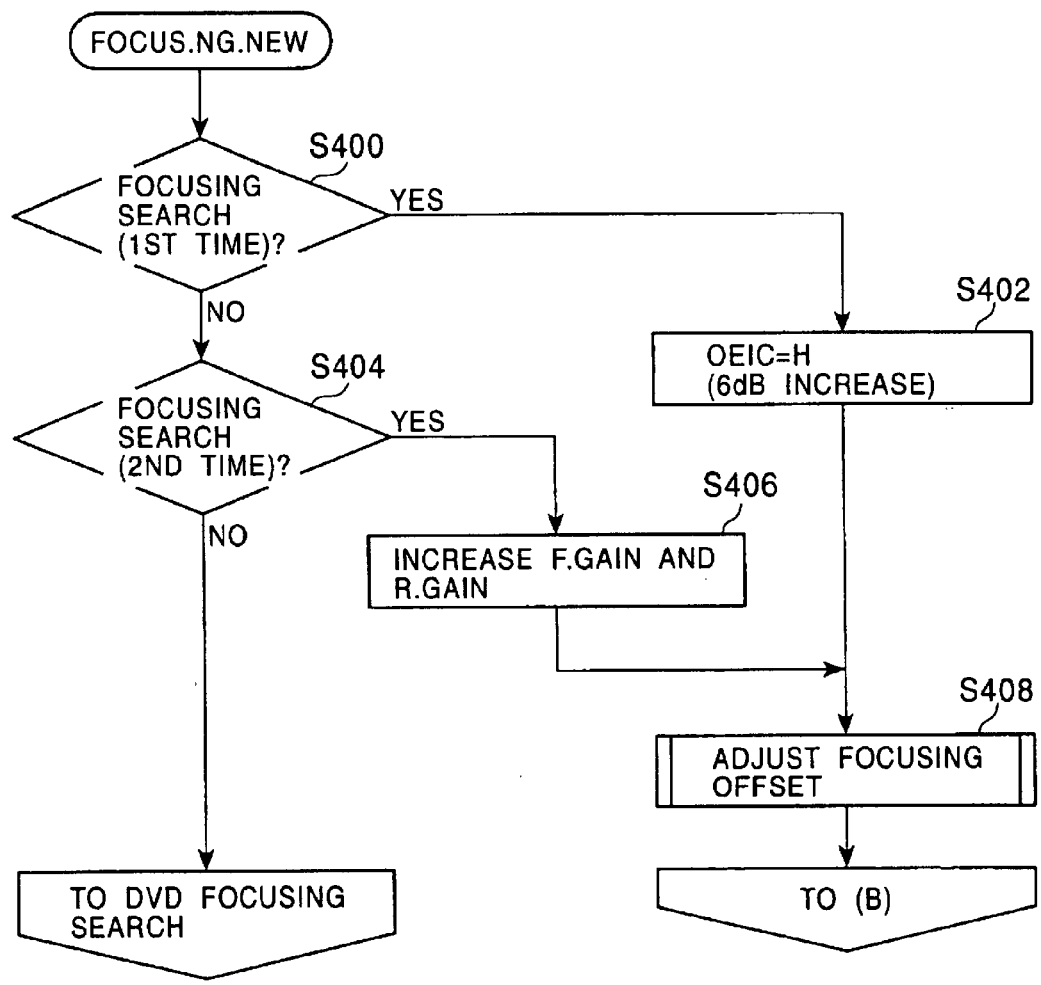
FIG. 5 is a flowchart for explaining a process for "FOCUS.NG.NEW"

The processes for "FOCUS.NG.NEW" shown in FIG. 5 will now be described.

If, as mentioned above, the focusing state is not obtained in step S116 in FIG. 2 and if it is determined in step S118 that the disk is "NEW DISK", the processes for "FOCUS.NG.NEW" are executed.

First, in step S400, after the focusing search was performed at the first time in step S114 in FIG. 2, whether the processing routine has advanced to the processes for "FOCUS.NG.NEW" or not is discriminated. In case of the first focusing search (YES), an amplification factor of the OEIC 4a is increased in step S402. In the embodiment, it is increased by 6 dB. For simplification of explanation, the case of increasing the amplification factor of the OEIC 4a is referred to as "H" and the case of decreasing it is referred to as "L".

By the increase of the amplification factor of 6 dB, the signal level of the focusing error signal SFE is doubled, thereby improving sensitivity of the focusing error detection. In other words, in case of performing the focusing error detection based on the astigmatism method, by setting a level of an error signal of an S-shaped curve of the focusing error to the double amplitude level, the sensitivity of the focusing error detection is improved.

In step S408, after the focusing offset adjustment was performed, step S114 in FIG. 2 follows and the second focusing search is performed.

When the second focusing search is performed and if it is determined in step S116 that the focusing state was obtained, the processes in step S120 and subsequent steps are executed and the reproducing conditions suitable for reproducing the optical disk DSK as NEW DISK are set.

Even when the second focusing search is executed in step S114, if the focusing state is not derived in step S116 in FIG. 2 and it is determined in step S118 that the disk is "NEW DISK", the processes for "FOCUS.NG.NEW" are executed again. It is decided that the second focusing search has been executed in step S404.

In step S406, the gain F.GAIN of the focusing servo and the gain R.GAIN of the RF amplifier 12 are increased to predetermined values, respectively. After that, the focusing offset adjustment is performed in step S408. The processing routine advances to step S114 in FIG. 2 and the third focusing search is executed. The amplification factor of the OEIC 4a is held to the value set in step S402.

If the third focusing search is executed and if it is determined in step S116 that the focusing state is obtained, the processes in step S116 and subsequent steps are executed. The reproducing conditions suitable for reproducing the optical disk DSK as NEW DISK are set.

Even when the third focusing search is executed in step S114 in FIG. 2, if the focusing state is not obtained in step S116 and it is decided in step S118 that the optical disk DSK is NEW DISK, the processes for "FOCUS.NG.NEW" are executed again. It is determined in step S404 that the third focusing search has been performed. That is, the answer is (NO) in step S404. In this case, since there is a possibility that the optical disk DSK is not the CD, the processing routine advances to "DVD focusing search" in FIG. 10.

In the processes for "FOCUS.NG.NEW", as mentioned above, by correcting the amplification factor of the OEIC 4a, the focusing servo gain, and the level of the RF signal SRF, the apparatus exits from a setup unable state which is caused due to manufacturing deviations or the like of the CDs. Further, the reproducing conditions suitable for reproduction of the actual optical disk DSK can be set. Even if the amplification factor of the OEIC 4a, the focusing servo gain, and the level of the RF signal SRF are corrected, when the apparatus cannot exit from the setup unable state, the processing routine advances to "DVD focusing search" in FIG. 10.

Processes for "FOCUS.NG.PLAYED" shown in FIG. 6 will now be described.

As mentioned above, if the focusing state is not obtained in step S114 in FIG. 2 and if it is decided in step S118 that the disk is PLAYED DISK, the processes for "FOCUS.NG.PLAYED" are executed.

First, in step S500, the first focusing search is executed in step S114 in FIG. 2 and, thereafter, whether the processing routine has advanced to the processes for "FOCUS.NG.PLAYED" or not is discriminated. If it is decided that the first focusing search has been performed (YES), step S114 in FIG. 2 follows and the second focusing search is executed.

When the second focusing search is executed in step S114 in FIG. 2 and if it is decided that the focusing state has been obtained in step S116, the processes in step S120 and subsequent steps are executed. The reproducing conditions suitable for reproducing the optical disk DSK as PLAYED DISK are set.

Even when the second focusing search is executed in step S114, if the focusing state is not obtained in step S116 and if it is determined in step S118 that the disk is "PLAYED DISK", the processes for "FOCUS.NG.PLAYED" are executed again. It is decided in step S502 that the second focusing search has been performed.

If the played optical disk DSK is the write once optical disk such as a CD-R, the pickup 4 is moved to the position on the outer rim side of the optical disk DSK by kicking the carriage mechanism to the position out of the home position in step S504. After that, step S114 in FIG. 2 follows and the third focusing search is executed. If the played optical disk DSK is a disk other than the write once optical disk, by moving the carriage mechanism to the home position, the pickup 4 is moved to the position on the inner rim side of the optical disk DSK. After that, step S114 in FIG. 2 follows and the third focusing search is executed.

When the third focusing search is executed and if it is determined in step S116 that the focusing state has been obtained, the processes in step S120 and subsequent steps are executed. The reproducing conditions suitable for reproducing the optical disk DSK as PLAYED DISK are set.

Even when the third focusing search is executed in step S114, if the focusing state is not obtained in step S116 in FIG. 2 and if it is determined in step S118 that the disk is "PLAYED DISK", the processes for "FOCUS.NG.PLAYED" are executed again. In step S502, it is decided that the third focusing search has been executed. Further, in step S506, whether the optical disk DSK is the CD or DVD is discriminated. In case of the CD, the processing routine advances to the processes for "FOCUS.NG.CD search" shown in FIG. 7. In case of the DVD, the processing routine advances to the processes for "FOCUS.NG.DVD search" shown in FIG. 8.

As mentioned above, in the processes for "FOCUS.NG.PLAYED", when the focusing search of the optical disk DSK as PLAYED DISK cannot be performed, the portion of optical disk DSK to be subjected to the focusing search is changed and the focusing search is executed. If the focusing search cannot be performed even after that, the processing routine advances to the processes for "FOCUS.NG.CD search" or "FOCUS.NG.DVD search" in accordance with the kind of optical disk DSK.

Figure 7:
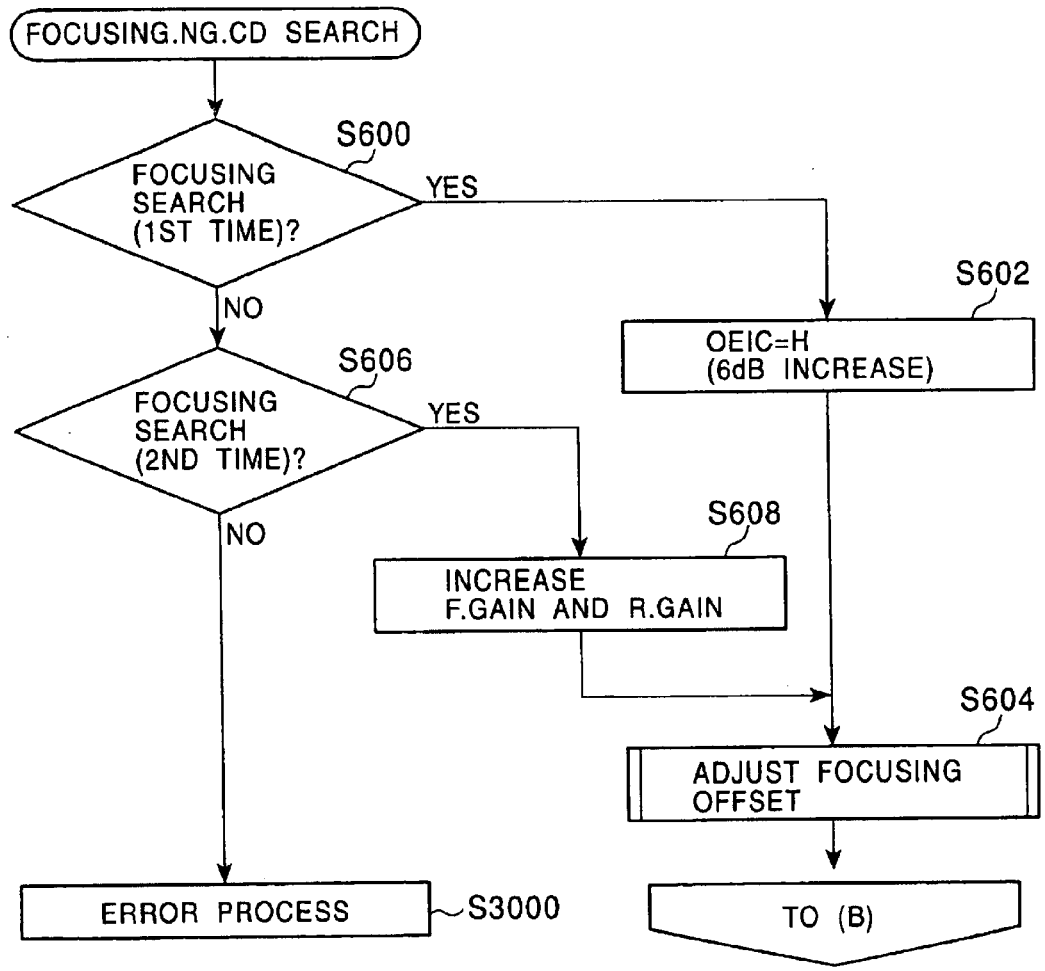
FIG. 7 is a flowchart for explaining a process for "FOCUS.NG.CD search"

The processes for "FOCUS.NG.CD search" shown in FIG. 7 will now be described.

Figure 6:
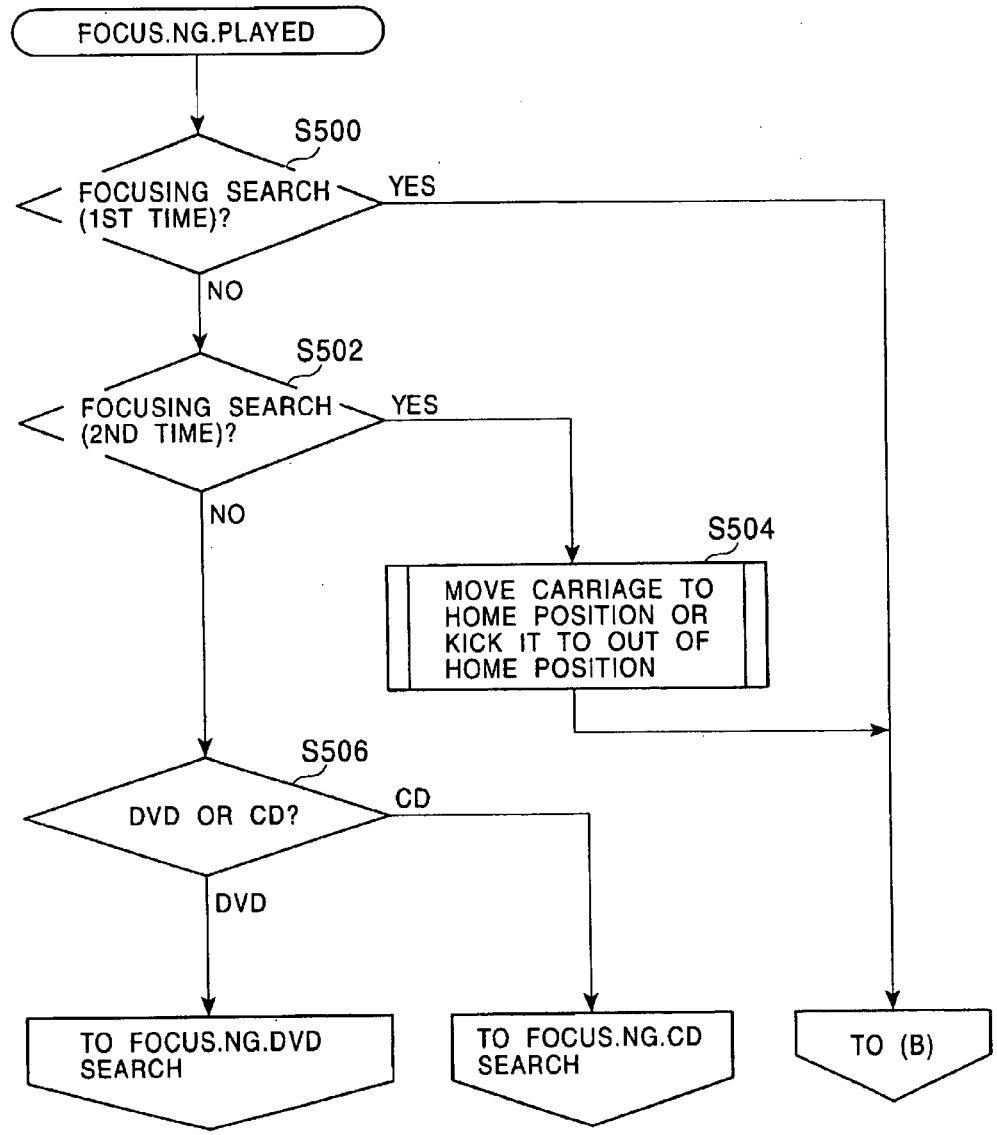
FIG. 6 is a flowchart for explaining a process for "FOCUS.NG.PLAYED"

First, in step S600, the portion of optical disk DSK to be subjected to the focusing search is changed in step S504 shown in FIG. 6 and, thereafter, whether the first focusing search has been executed or not is discriminated. In case of the first focusing search (YES), the amplification factor of the OEIC 4a is increased by 6 dB in step S602. The signal level of the focusing error signal SFE is, thus, doubled and the sensitivity of the focusing error detection is improved.

After the focusing offset was adjusted in step S604, step S114 shown in FIG. 2 follows and the focusing search is executed again.

When the focusing search is executed again and the focusing state is derived, it is determined in step S116 that the focusing state has been obtained. The processes in step S120 and subsequent steps are executed. The reproducing conditions suitable for reproduction of the optical disk DSK as NEW DISK are set.

When, however, the focusing state is not obtained, the processes for "FOCUS.NG.CD search" are executed again.

It is determined in step S606 that the focusing search (second time) has been performed again. In step S608, the gain F.GAIN of the focusing servo and the gain R.GAIN of the RF amplifier 12 are increased to predetermined values, respectively. After that, the focusing offset adjustment is performed in step S604. Step S114 in FIG. 2 follows and the third focusing search is executed. The amplification factor of the OEIC 4a is held to the value set in step S602.

When the third focusing search is executed and if it is determined in step S116 that the focusing state has been obtained, the processes in step S120 and subsequent steps are executed. The reproducing conditions suitable for reproducing the optical disk DSK as NEW DISK are set.

Even when the third focusing search is executed in step S114, if the focusing state is not obtained and if it is determined in step S606 that the third focusing search has been executed, the error process (step S3000) is executed and an error is displayed. The process for forcedly returning the optical disk DSK to the original enclosing position in the magazine or the like is executed.

As mentioned above, in the processes for "FOCUS.NG.CD search", by correcting the amplification factor of the OEIC 4a, the focusing servo gain, and the level of the RF signal SRF, the apparatus exits from the setup unable state which is caused due to the manufacturing variation of the CDs or the like. Further, the reproducing conditions suitable for reproducing the actual optical disk DSK can be set. When the apparatus cannot exit from the setup unable state even if the amplification factor of the OEIC 4a, the focusing servo gain, and the level of the RF signal SRF were corrected, the optical disk DSK as PLAYED DISK is regarded as a defective disk and the error process is executed.

The processes for "FOCUS.NG.DVD search" shown in FIG. 8 will now be described.

As mentioned above, when the optical disk DSK is a PLAYED DISK, the reproducing conditions are set on the basis of the history data Dplayed. If, even though the portion of the optical disk DSK which is subjected to the focusing search was changed, the focusing state is not obtained, the processes for "FOCUS.NG.DVD search" are executed. When, for example, the optical disk DSK is the high density DVD having a double recording layers, there is a case where the above situation occurs.

In step S700, the first focusing search in "FOCUS.NG.DVD search" is executed. In next step S702, it is discriminated whether the focusing state has been obtained or not. When the focusing state is obtained (when the PLL of the focusing servo is locked), while the reproducing conditions of the DVD set on the basis of the history data Dplayed are maintained in step S704, the processing routine advances to the processes in step S204 and subsequent steps in FIG. 3.

If no problem occurs in the processes in step S204 and subsequent steps, there are set the reproducing conditions suitable for reproduction the optical disk DSK as PLAYED DISK. The history data Dplayed is finally formed and stored into the storing unit 5a.

If it is decided in step S702 that the focusing state is not obtained, it is discriminated whether the focusing search in step S700 is the first one or not in step S706. If it is the first focusing search, it is discriminated whether the amplification factor of the OEIC 4a has been set to the value of the standard reproducing conditions (OEIC=L) or not is discriminated in step S708.

If the amplification factor of the OEIC 4a is not set to the value of the standard reproducing conditions, the amplification factor of the OEIC 4a is further increased by 6 dB in step S710. Further, the gain F.GAIN of the focusing servo and the gain R.GAIN of the RF amplifier 12 are increased to predetermined values, respectively. After that, the focusing offset adjustment is performed in step S716. The second focusing search in step S700 is performed.

If the amplification factor of the OEIC 4a has been set to the value of the standard reproducing conditions, a predetermined flag is set to FLG2=1 in step S712. Further, the amplification factor of the OEIC 4a is increased by 6 dB in step S712 and, further, only the gain F.GAIN of the focusing servo is increased to a predetermined value. After that, the focusing offset adjustment is performed in step S716 and the second focusing search in step S700 is executed.

If the focusing state is obtained by the second focusing search, while the reproducing conditions set in step S708 are maintained (step S704), the processing routine advances to the processes in step S204 and subsequent steps in FIG. 3. If no problem occurs in the processes in step S204 and subsequent steps, there are set the reproducing conditions suitable for reproduction of the optical disk DSK as PLAYED DISK and the history data Dplayed is finally formed and stored into the storing unit 5a.

When the focusing state is not obtained by the second focusing search, it is determined that the focusing state is not obtained even if the second focusing search was performed in step S718. A flag FLG2 is checked in step S720. When FLG2=1, it is determined that after the process in step S714 was executed, the processing routine has advanced to step S720. When FLG2≠1, it is determined that after the process in step S710 was executed, the processing routine advances to step S720.

When FLG2=1, in step S724, the amplification factor of the OEIC 4a is further increased by 6 dB and, further, the gain F.GAIN of the focusing servo and the gain R.GAIN of the RF amplifier 12 are increased to the predetermined values, respectively. After that, the focusing offset adjustment is performed in step S716. Further, the focusing search in step S700 is executed.

When FLG2≠1, in step S722, the amplification factor of the OEIC 4a is decreased by 6 dB (OEIC=L) and, further, the gain F.GAIN of the focusing servo and the gain R.GAIN of the RF amplifier 12 are initialized. After that, the focusing offset adjustment is performed in step S716. Further, the focusing search in step S700 is executed.

When the focusing state is obtained by further executing the focusing search as mentioned above, while the reproducing conditions set in step S722 or S724 are maintained (step S704), the processing routine advances to the processes in step S204 and subsequent steps in FIG. 3. If no problem occurs in the processes in step S204 and subsequent steps, there are set the reproducing conditions suitable for reproduction the optical disk DSK as PLAYED DISK and the history data Dplayed is finally formed and stored into the storing unit 5a.

If the focusing state is not obtained even after the focusing search was further performed, the discrimination result in step S718 is (NO). In step S4000, the optical disk DSK as a played DVD is regarded as a defective disk and an error process is executed.

As mentioned above, in the processes for "FOCUS.NG.DVD search", by performing the focusing search in combination of the reproducing conditions in steps S710, S712, S722, and S724, the reproducing conditions suitable for reproduction of the optical disk DSK are set.

The processes for "partial search" shown in FIG. 9 will now be described.

As mentioned above, when the proper RF signal is not obtained in steps S120 and S122 in FIG. 2, the processes for "partial search" are executed. For example, if the optical disk DSK is the CD-R and a mirror surface portion where no information is recorded is subjected to the focusing search, the processes for "partial search" are executed.

First, in step S800, the rotation of the spindle motor 3 is FG controlled on the basis of the FG signal Sps which is generated from the spindle motor 3. Further, in step S802, by kicking the carriage mechanism to a position out of the home position, the pickup 4 is moved to the outer rim side of the optical disk DSK.

Subsequently, instep S804, whether the focusing search in step S114 in FIG. 2 is the first search or not is discriminated. In case of the first focusing search (YES), the processing routine advances to step S114 in FIG. 2 and the second focusing search is executed. After completion of the second focusing search, the proper RF signal is obtained. Further, if no problem occurs in the processes in step S124 and subsequent steps, the reproducing conditions suitable for reproduction of the optical disk DSK are set and the history data Dplayed is finally formed and stored into the storing unit 5a.

When the proper RF signal is not obtained, the processes for "partial search" are executed again. If it is determined in step S806 that the second focusing search has been performed, the gain of the RF amplifier 12 is increased by a predetermined value in step S808. After that, step S114 in FIG. 2 follows and the third focusing search is executed.

When the proper RF signal is obtained by the third focusing search and, further, if no problem occurs in the processes in step S124 and subsequent steps, the reproducing conditions suitable for reproduction of the optical disk DSK are set and the history data Dplayed is finally formed and stored into the storing unit 5a.

When the proper RF signal is not obtained by the third focusing search, it is determined in step S806 that the proper RF signal is not obtained even by the third focusing search (NO), the optical disk DSK is regarded as a defective disk and the error process is executed in step S5000.

As mentioned above, in the processes for "partial search", the gain of the RF amplifier 12 is mainly increased and the portion on the outer rim side of the optical disk DSK is subjected to the focusing search, thereby discriminating whether the disk is what is called a partial disk or not.

The processes for "DVD focusing search" shown in FIG. 10 will now be described.

The processes for "DVD focusing search" are executed when the focusing state is not obtained under the reproducing conditions for reproducing the CD.

First, instep S900, the set value (amplification factor) of the OEIC 4a under the reproducing conditions at the time when the focusing state is not obtained under the reproducing conditions for reproducing the CD is maintained and under the reproducing conditions for the servo circuits 7 and 10, RF amplifier 12, and the like other than the OEIC 4a are initially set on the basis of the standard reproducing condition data Dnew.

In next step S902, to which reproducing condition the set value (amplification factor) of the OEIC 4a at that time point corresponds is discriminated. When the set value (amplification factor) is "L", the amplification factor of the OEIC 4a is set to "L" in step S904. When the amplification factor of the OEIC 4a is not "L", that is, when it is "H", the amplification factor of the OEIC 4a is set to "H" in step S906.

The amplification factor of the OEIC 4a at that time point is succeeded as mentioned above. That is, the reproducing conditions set for reproducing the CD are used as they are and the focusing offset is adjusted in step S908. Further, in step S910, the spindle motor 3 is rotated under the reproducing conditions of the DVD.

Subsequently, after the focusing search was performed in step S912, the processes in step S914 and subsequent steps are executed.

Figure 8:
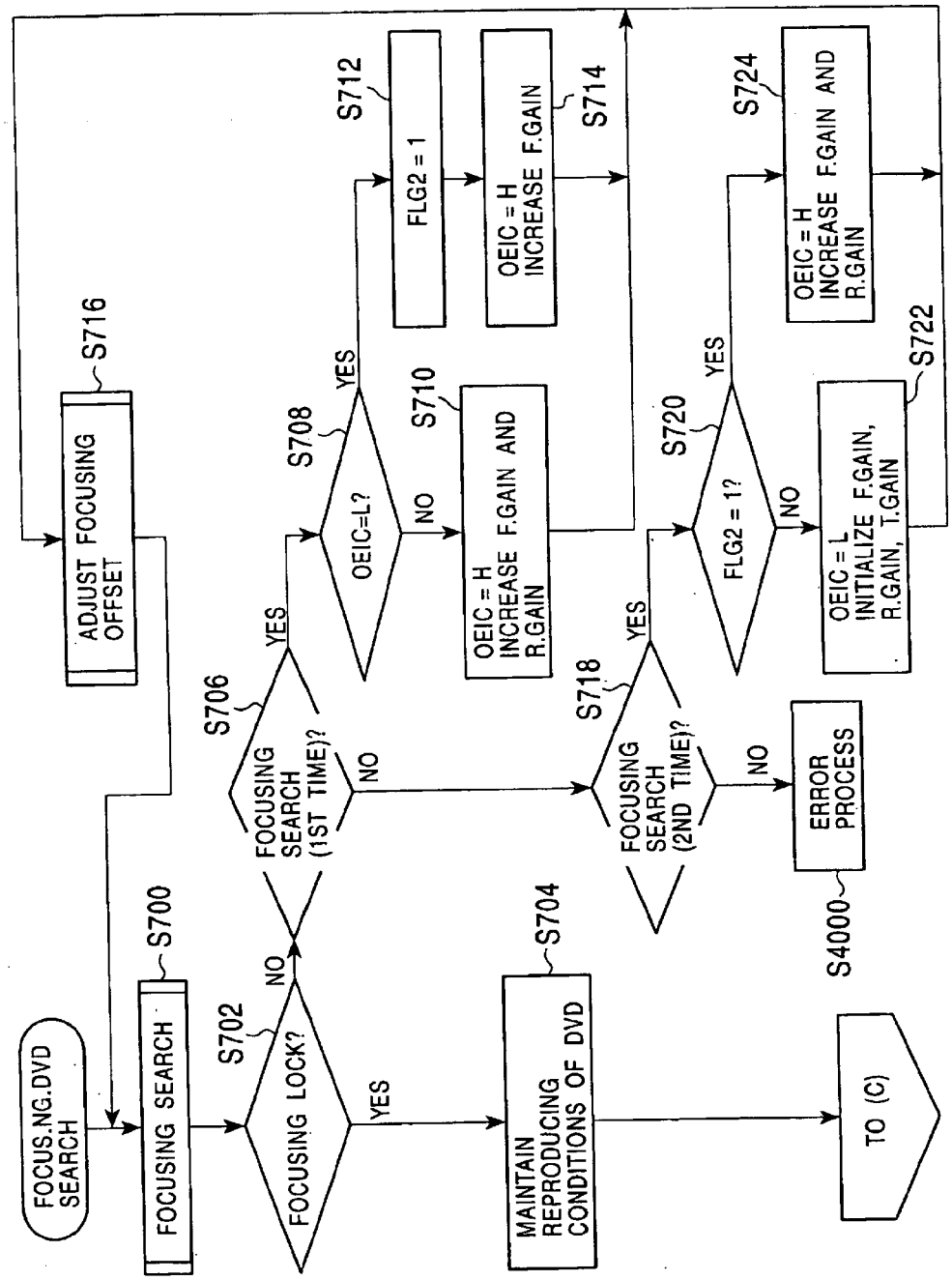
FIG. 8 is a flowchart for explaining a process for "FOCUS.NG.DVD search"

Each process in steps S914 to S938 in FIG. 10 is the same as each process in steps S702 to S724 shown in FIG. 8. That is, the processes in steps S914, S918, and S930 are the same as those in steps S702, S706, and S718, the processes in steps S920, S922, S924, and S926 are the same as those in steps S708, S710, S712, and S714, and the processes in steps S932, S934, S936, and S938 are the same as those in steps S720, S722, S724, and S716, respectively.

In a manner similar to "DVD.NG.DVD search", therefore, by performing the focusing search in combination of the reproducing conditions in steps S922, S926, S934, and S936, the reproducing conditions suitable for reproducing the optical disk DSK are set.

Although the focusing search was performed three or more times in step S912 in "DVD focusing search", if the focusing state is not obtained, the processing routine advances to step S940 from step S930. Whether all of the reproducing conditions (four sets of reproducing conditions) in steps S922, S926, S934, and S936 have been set every time and the focusing search in step S912 has been performed or not is discriminated.

If a discrimination result is (YES), the spindle motor 3 is stopped (step S942). The semiconductor laser is lit off (step S944). By kicking the carriage mechanism to the position out of the home position, the pickup 4 is moved to the outer rim side of the optical disk DSK (step S946). After that, the setup from step S100 shown in FIG. 2 is repeated again.

If the discrimination result in step S940 is (NO), the error process is performed to the optical disk DSK in step S6000.

If it is determined in step S914 that the focusing state has been obtained, in step S916, while the reproducing conditions in the state where the focusing state has been obtained are maintained, the processes in step S204 and subsequent steps shown in FIG. 3 are executed. If no problem occurs in the processes in step S204 and subsequent steps, the reproducing conditions suitable for reproduction of the optical disk DSK as a DVD are set and the history data Dplayed is finally formed and stored into the storing unit 5a.

As mentioned above, in the processes for "DVD focusing search", by processes similar to those of "DVD.NG.DVD search", whether the optical disk DSK is the DVD or not is discriminated and, when it is the DVD, the reproducing conditions suitable for reproduction of the optical disk DSK are set.

It should be noted that, as mentioned above, in step S900, the set value (amplification factor) of the OEIC 4a in the reproducing conditions at the time when the focusing state cannot be obtained even under the reproducing conditions for reproducing the CD is maintained, and the reproducing conditions for the servo circuits 7 and 10, RF amplifier 12, and the like other than the OEIC 4a are initially set on the basis of the standard reproducing condition data Dnew, and further, in step S902, when the set value (amplification factor) of the OEIC 4a is "L", the amplification factor of the OEIC 4a is set to "L" in step S904 and, when the amplification factor of the OEIC 4a is not "L", the amplification factor of the OEIC 4a is set to "H" in step S906, and the focusing search in step S912 is started.

That is, when the focusing state is not obtained although the setup of NEW DISK was started on the basis of the reproducing conditions of the CD-DA, the amplification factor of the OEIC 4a and the focusing gain F.GAIN are changed on the basis of the predetermined conditions, and in the other cases (the setting of the OEIC 4a), the focusing search is continuously performed by setting the reproducing conditions of the CD-DA to the reproducing conditions of the DVD, and when the focusing state is obtained, the reproducing conditions suitable for reproducing the DVD are set.

According to the embodiment, as mentioned above, when the reproducing conditions of the DVD are set up, since the continuous setup is performed by using the reproducing conditions of the CD which have been set up before, a time that is required until completion of the setup can be reduced as compared with that in the prior art, and the usability can be improved.

According to the invention as described above, when the setup is performed by the reproducing conditions corresponding to the first kind of optical disk and the setup is subsequently performed by the reproducing conditions corresponding to the second kind of optical disk, the reproducing conditions which succeed to at least a part of the reproducing conditions corresponding to the first kind of optical disk are used as reproducing conditions corresponding to the second kind of optical disk and the setup is performed, so that the time that is required for setup can be reduced as compared with that in the prior art in which the setup is performed under the individual reproducing conditions corresponding to the kind of optical disk.

When the setup is completed, the reproducing conditions corresponding to the optical disk as a target of the setup are stored and, when the same optical disk is set up again, the stored reproducing conditions are used, so that the time which is required for the setup can be reduced.

Since, according to the invention, the time which is required for the setup can be reduced, in a situation such that the number of kinds of optical disks increases, the optical disk reproducing apparatus having the compatibility corresponding to many kinds of optical disks can be provided.

This application is based on a Japanese Patent Application No. 2000-150202 which is hereby incorporated by reference.

What is claimed is:

1. An optical disk reproducing apparatus for performing a setup for reproducing a plurality of different kinds of optical disks by proper reproducing conditions, comprising:

first means for performing the setup by reproducing conditions corresponding to the first kind of optical disk; and second means for performing the setup by reproducing conditions corresponding to the second kind of optical disk, wherein said second means uses reproducing conditions which succeed to at least a part of the reproducing conditions of said first means when the setup is subsequently performed by said second means, after the setup is performed by said first means.

2. An apparatus according to claim 1, wherein the setup is subsequently performed by said second means when the setup is not completed by said first means.

3. An apparatus according to claim 1, further comprising memory means for, storing one or a plurality of conditions as reproducing conditions peculiar to said setup optical disk when the setup by said first means or said second means is completed.

4. An apparatus according to claim 3, wherein the setup is performed by using said reproducing conditions when the reproducing conditions corresponding to the optical disk to be set up have been stored in said memory means, and the setup is performed by said first means when the reproducing conditions corresponding to the optical disk to be set up are not stored in said memory means.

5. A setup method of performing a setup for reproducing a plurality of different kinds of optical disks by proper reproducing conditions, comprising:

a first step of performing the setup by the reproducing conditions corresponding to the first kind of optical disk; and a second step of performing the setup by the reproducing conditions corresponding to the second kind of optical disk, wherein the reproducing conditions which succeed to at least a part of the reproducing conditions of said first step are used in said second step when the setup is subsequently performed by said second step after the setup was performed by said first step.

6. A method according to claim 5, wherein the setup is subsequently performed by said second step when the setup is not completed in said first step.

7. A method according to claim 5, wherein one or more of conditions are stored as reproducing conditions which are peculiar to said setup optical disk when the setup by said first step or said second step is completed.

8. A method according to claim 7, wherein the setup is performed by using said stored reproducing conditions when the reproducing conditions corresponding to the optical disk to be set up have been stored, and the setup is performed by said first step when the reproducing conditions corresponding to the optical disk to be set up are not stored.

* * * * *